US007333887B2

(12) United States Patent
Baiada et al.

(10) Patent No.: US 7,333,887 B2
(45) Date of Patent: Feb. 19, 2008

(54) METHOD AND SYSTEM FOR TACTICAL GATE MANAGEMENT BY AVIATION ENTITIES

(76) Inventors: R. Michael Baiada, 30943 Buttermilk Ct., Evergreen, CO (US) 80439; Lonnie H. Bowlin, 700 Woodland Way, Owings, MD (US) 20736

( * ) Notice: Subject to any disclaimer, the term of this patent is extended or adjusted under 35 U.S.C. 154(b) by 604 days.

(21) Appl. No.: 10/913,062

(22) Filed: Aug. 6, 2004

(65) Prior Publication Data

US 2005/0071076 A1 Mar. 31, 2005

Related U.S. Application Data

(60) Provisional application No. 60/493,494, filed on Aug. 8, 2003.

(51) Int. Cl.
*G06F 19/00* (2006.01)

(52) U.S. Cl. .......................................... 701/120; 701/3

(58) Field of Classification Search .................... 701/3, 701/14–18, 117–120; 340/945, 951, 959, 340/961; 244/158.4, 75.1, 183; 342/29, 342/33–35
See application file for complete search history.

(56) References Cited

U.S. PATENT DOCUMENTS 4,196,474 A 4/1980 Buchanan et al. .......... 364/461
4,926,343 A 5/1990 Tsuruta et al. .............. 364/513
5,200,901 A 4/1993 Gerstenfeld ................. 364/439
5,321,605 A 6/1994 Chapman et al. ........... 364/402
5,369,570 A 11/1994 Parad ......................... 364/401
5,890,133 A 3/1999 Ernst ............................ 705/7
5,953,707 A 9/1999 Huang et al. ................. 705/10
6,463,383 B1 10/2002 Baiada et al. ............... 701/120
6,584,400 B2 6/2003 Beardsworth ............... 701/120
6,721,714 B1 4/2004 Baiada et al. .................. 705/7
6,789,011 B2 * 9/2004 Baiada et al. ............... 701/120
6,873,903 B2 * 3/2005 Baiada et al. ............... 701/120

FOREIGN PATENT DOCUMENTS

GB 2327517 6/1997
WO WO 0062234 10/2000

* cited by examiner

*Primary Examiner*—Yonel Beaulieu
(74) *Attorney, Agent, or Firm*—Larry J. Guffey

(57) ABSTRACT

A computer implemented method for an aviation system to manage the temporal assignment of airport gates for use by a plurality of aircratf includes the steps of: (a) collecting and storing data, (b) processing the data to predict the trajectories of the aircraft, (c) processing the data to predict the loads imposed on the ground resources and gates (d) processing the data, trajectories and loads to identify the various possible ways to distribute the ground system resources and assign the gates so as to meet the time constraints of the predicted trajectories and loads, and (e) assigning to each of the plurality of aircraft a gate for use for a prescribed period.

18 Claims, 5 Drawing Sheets

Simplified Method of the Goal Function Within the Present Invention

FIG. 1 - Aircraft IFR Flight Process (Prior Art)
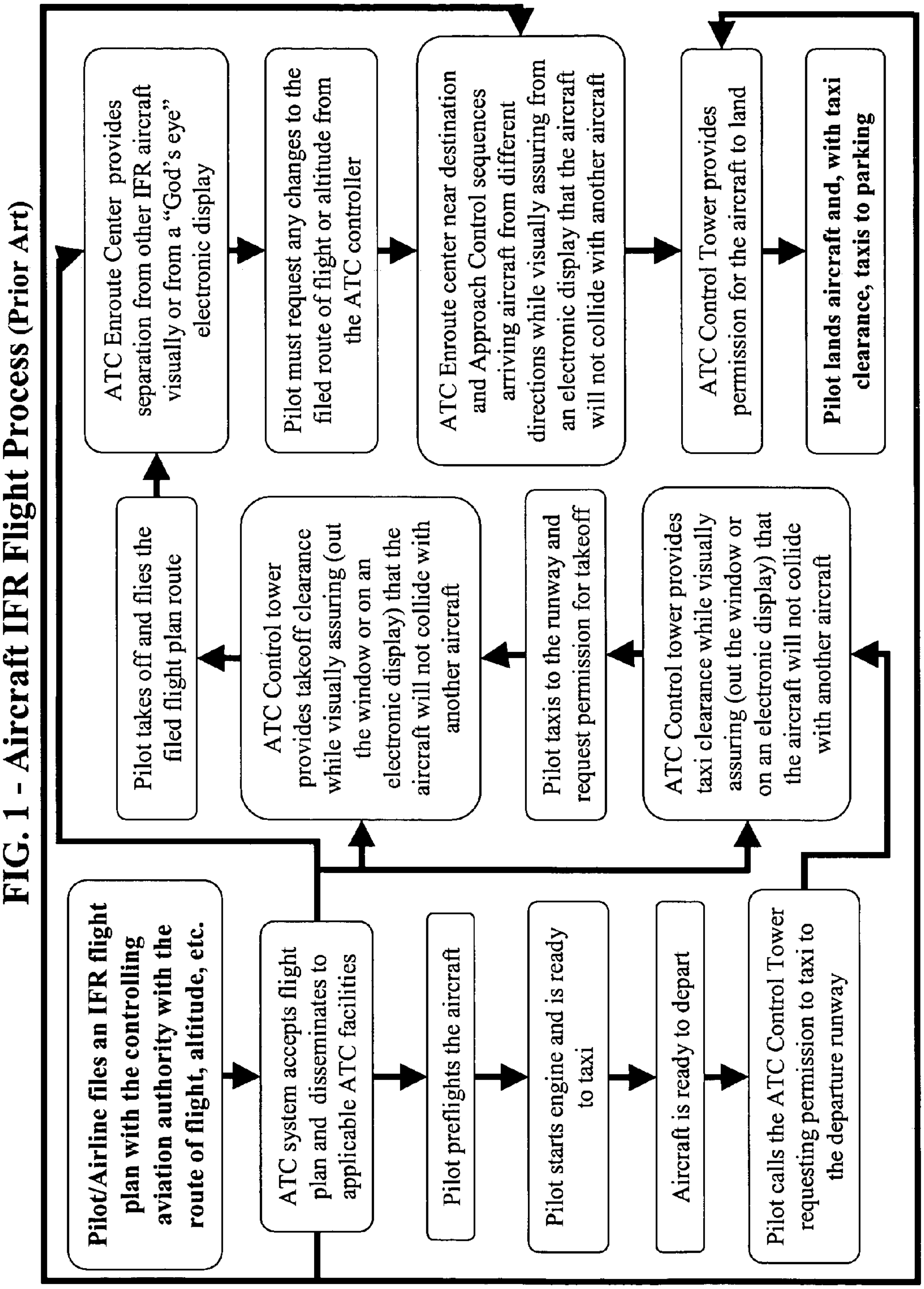

FIG. 2 - Airport Arrival/Departure Structure (Prior Art)
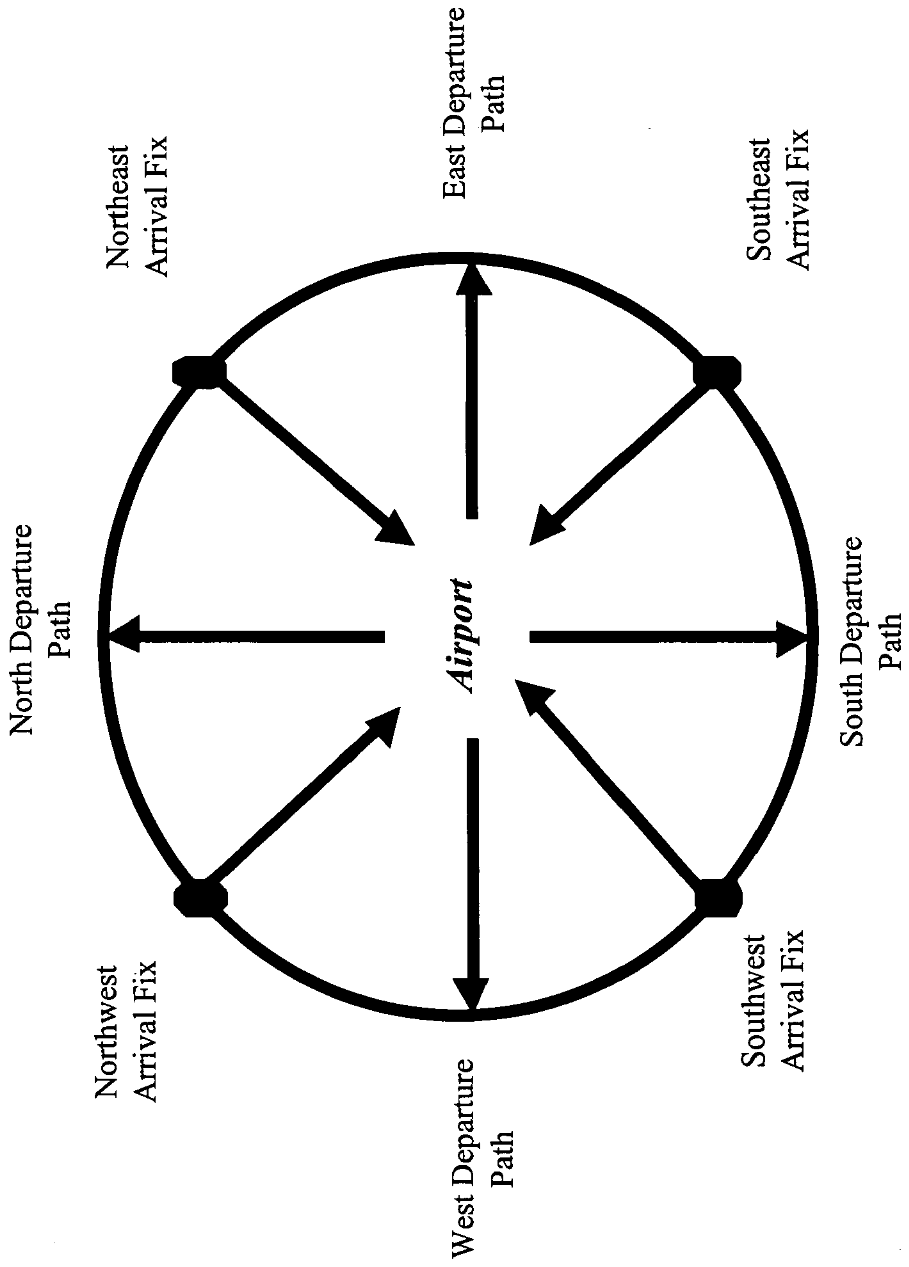

FIG. 3 – Simplified Method of the Goal Function Within the Present Invention
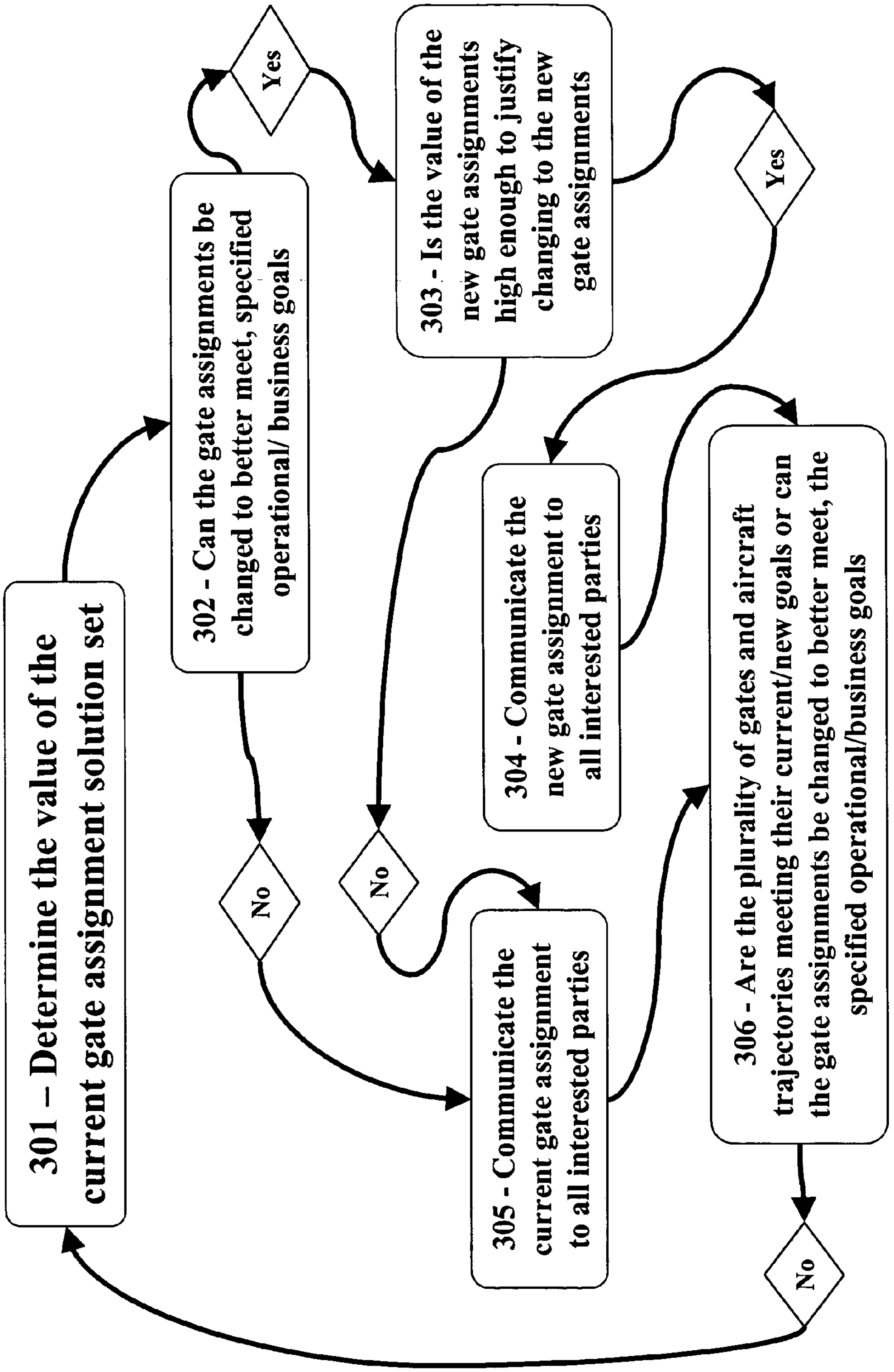

FIG. 4 – Sample Data Sets, Mathematical Functions and Basic Process steps
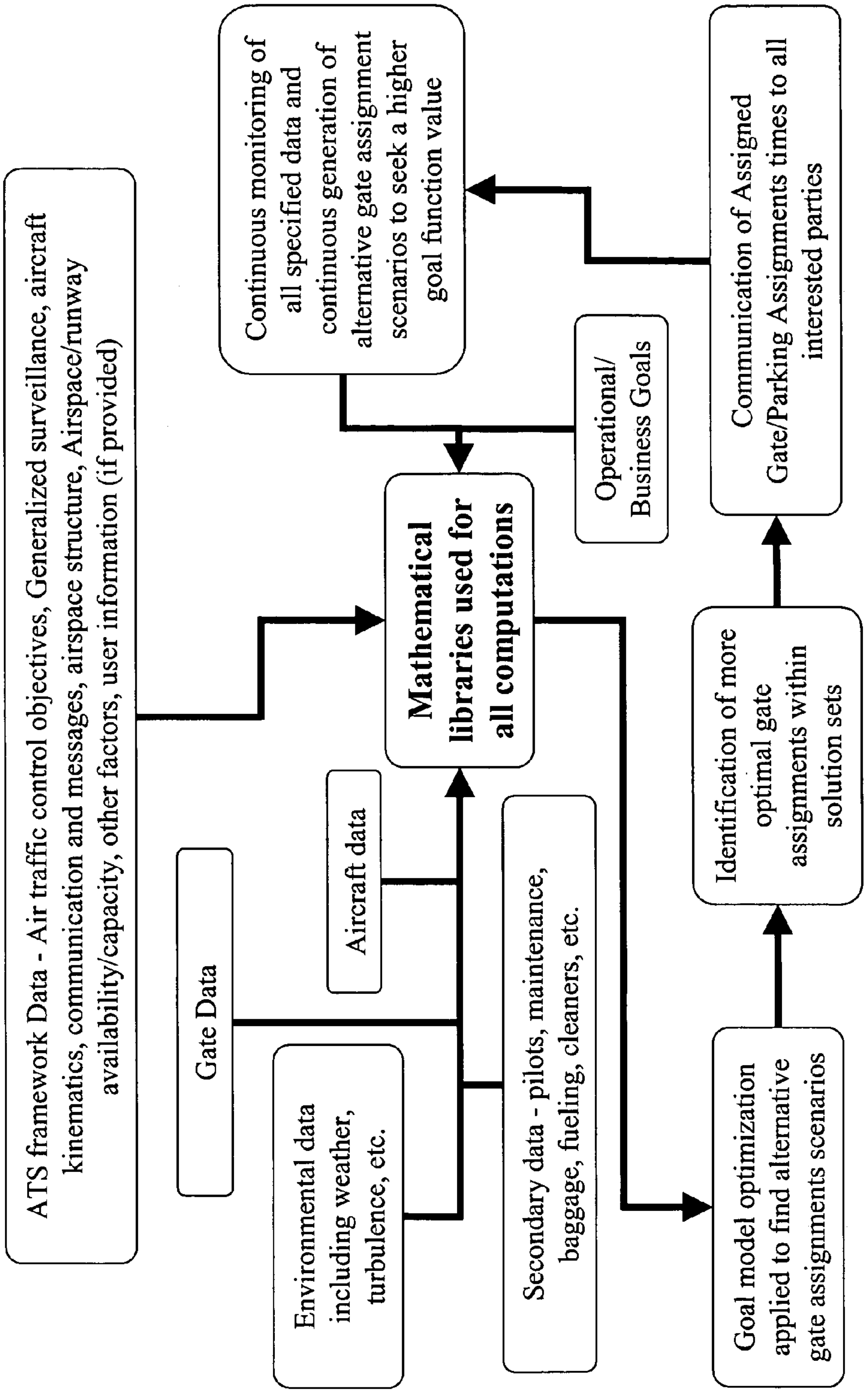

FIG. 5 - Sample of the Method's Processing Sequence
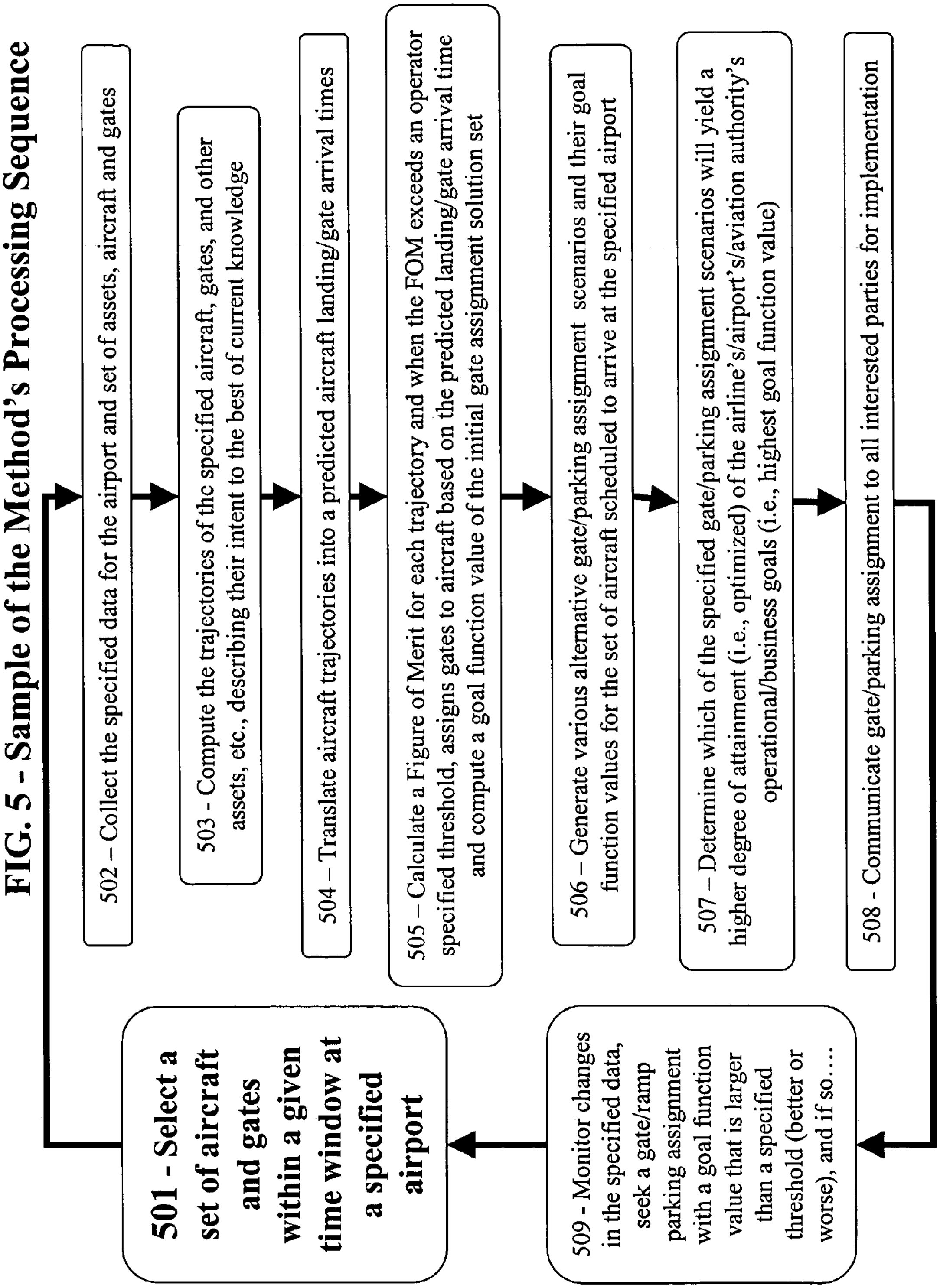

METHOD AND SYSTEM FOR TACTICAL GATE MANAGEMENT BY AVIATION ENTITIES

CROSS-REFERENCE TO RELATED APPLICATIONS & PATENTS

This application claims the benefit of U.S. Provisional Patent Application No. 60/493,494, filed Aug. 8, 2003 by R. Michael Baiada and Lonnie H. Bowlin.

This application is related to the following U.S. Patent Documents: U.S. patent application Ser. No. 10/808,970 entitled "Method and System for Aircraft System Flow Management by Airlines/Aviation Authorities" and filed Mar. 25, 2004; U.S. Pat. No. 6,721,714, entitled "Method and System for Tactical Airline Management" and which issued Apr. 13, 2004; U.S. Pat. No. 6,463,383, entitled "Method And System For Aircraft Flow Management By Airlines/Aviation Authorities" and which issued Oct. 8, 2002; U.S. Pat. No. 6,789,011 entitled "Method And System For Allocating Aircraft Arrival/Departure Slot Times" and which issued Sep. 7, 2004; U.S. Pat. No. 6,873,903 entitled "Method and System For Tracking and Prediction of Aircraft Trajectories" and which issued Mar. 29, 2005; all these documents having been submitted by or issued to the same applicants: R. Michael Baiada and Lonnie H. Bowlin. The teachings of these materials are incorporated herein by reference to the extent that they do not conflict with the teaching herein.

BACKGROUND OF THE INVENTION

1. Field of the Invention

The present invention relates to data processing, asset tracking and gate management in the airline industry. More particularly, this invention relates to methods and systems for an aviation entity (i.e., airlines, airports, aviation authorities) to better manage their aircraft gate/ramp parking function as it relates to the aircraft arrival/departure flow at a specified airport.

2. Description of the Related Art

The need for and advantages of management operation systems that optimize complex, multi-faceted, interdependent processes have long been recognized. Thus, many complex methods and optimization systems have been developed. However, as applied to management of the aviation industry, and specifically, the aircraft gate/ramp parking function, such methods often have been fragmentary or overly restrictive and have not addressed the overall optimization of key aspects of an airline's/airport's/aviation authority's operational/business goals.

The patent literature for the aviation industry's operating systems and methods is relatively sparse and includes: U.S. Pat. No. 6,721,714—"Method and System for Tactical Airline Management, U.S. Pat. No. 6,463,383—"Method And System For Aircraft Flow Management By Aviation Authorities", U.S. Pat. No. 5,200,901—"Direct Entry Air Traffic Control System for Accident Analysis and Training," U.S. Pat. No. 4,926,343—"Transit Schedule Generating Method and System," U.S. Pat. No. 4,196,474—"Information Display Method and Apparatus for Air Traffic Control," United Kingdom Patent No. 2,327,517A—"Runway Reservation System," PCT International Publication No. WO 00/62234—"Air Traffic Management System," and USPTO Publication Ser. No. US-2003-0050646-A1—"Method and System For Tracking and Prediction of Aircraft Trajectories."

Airlines/airports/aviation regulatory authorities are responsible for matters such as the assignment and management for parking aircraft at gates and in specific ramp parking areas. Yet, in the current art, there appears to have been few successful attempts by the various airlines/airports/CAAs to make real-time, trade-offs between their different operational and business goals and the competing goals of other entities as they relate to the optimization of the safe and efficient parking of aircraft.

Many of the current airline gate assignment processes are often done too early (i.e., months in advance) and only manually changed on an individual aircraft by aircraft basis when things begin to deteriorate. Or, as is done by some airports, the process is done too late, after the aircraft land.

An obvious key aspect of any process to better manage the efficient assignment of gates and/or ramp parking is the predicted arrival time of the aircraft. Clearly, the aircraft must land before it can proceed to the assigned gate or ramp parking spot. Yet, in the current art, there has been, with a few exceptions, little success at accurately predicting aircraft and asset trajectories or the time sequencing of aircraft flows. Therefore, it is important to understand the variance, unpredictability and randomness inherent within the current art of aircraft flow into an airport.

In the prediction of the aircraft arrival time, one must account for all of the factors, including, but not limited to: weather, targeted aircraft flight speed, winds, air traffic control (ATC) actions, conflicting demands for landing space and times, wake turbulence, etc. For background information on this topic, see USPTO Publication Ser. No. US-2003-0050646-A1—"Method and System For Tracking and Prediction of Aircraft Trajectories."

To better understand the aviation processes, FIG. 1 has been provided to indicate the various stages in a typical aircraft flight process. It begins with the filing of a flight plan by the airline/pilot with one of the many Civil Aviation Authorities (CAA) throughout the world, including the Federal Aviation Administration (FAA) within the U.S.

Next the pilot arrives at the airport, starts the engine, taxis, takes off and flies the flight plan filed with the aviation authority (i.e., route of flight). Once the aircraft is moving, if the aircraft is on an IFR flight plan, an ATC controller is responsible for ensuring that adequate separation is maintained between IFR aircraft. That said, the aviation authority (CAA's Air Traffic Control, i.e., ATC) system must approve any change to the trajectory of the aircraft.

As the aircraft approaches the destination airport, typical initial arrival sequencing (accomplished on a first come, first serve basis, e.g., the aircraft closest to the arrival fix is first, next closest is second and so on) is accomplished by the enroute ATC center near the arrival airport (within approximately 100 miles of the airport), refined by the ATC arrival/departure facility (within approximately 25 miles of the arrival airport), and then approved for landing by the ATC arrival tower (within approximately 10 miles of the arrival airport). Once on the ground, the aircraft is taxied to a gate (i.e., jetway) or ramp parking spot.

Current CAA practices for managing airport arrival flows to avoid overloads at arrival airports involve sequencing aircraft arrivals by linearizing an airport's traffic flow according to very structured, three-dimensional, aircraft arrival paths, 100 to 200 miles from the airport or by holding incoming aircraft at their departure airports. For a large hub airport (e.g., Chicago, Dallas, Atlanta), these paths involve specific geographic points that are separated by approximately ninety degrees; see FIG. 2. Further, if the traffic into an arrival fix to the airport is relatively continuous over a period of time, the linearization of the aircraft flow is effectively completed hundreds of miles from the arrival fix. This can significantly restrict all the aircraft's arrival speeds, since all in the line of arriving aircraft are limited to that of the slowest aircraft in the line ahead. Yet, even though the data and capability exists to update the aircraft trajectory to account for this linearization, it is rarely done. And even if it is done, the data is not transmitted to the gate management function to determine the impact or seek an alternative gate/ramp parking solution.

Further complicating the arrival flow is Mother Nature. If a twenty-mile line of thunderstorms develops over one of the structured arrival fixes—the flow of traffic stops. Can the aircraft easily fly around the weather? Many times—Yes. Will the structure in the current ATC system allow it? Most times—No. To fly around the weather, an arriving aircraft could potentially conflict with the departing aircraft, which the system structure dictates must climb out from the airport between the arrival fixes. Again, if this occurs, the aircraft trajectory is rarely updated, nor is the gate management process advised.

Unfortunately, as mentioned above, the variation and randomness introduced into an aircraft arrival flow sequencing, although mostly predictable, is rarely accounted for in real time in the current art. Or if it is done, it is done late in the arrival process, when the aircraft is within 100 miles of the destination airport. This creates large variances (5, 10, and upwards of 30 minutes) in the predicted landing times, and therefore severe strains on the process of managing the gate/ramp parking management function.

Some aircraft land earlier than expected, some later; some aircraft are forced to wait for their gate, while other gates are open. All of which leads to inefficiencies, increased cost, lower profits and unhappy passengers (i.e., lower product quality).

Thus, despite the above noted prior art, airlines/airports/CAAs continue to need more efficient methods and systems for managing their gate/ramp parking assignment function. Therefore, given that the data and processing capability is now available to more accurately predict and match aircraft and gate trajectories, the present invention attempts to disclose such a more efficient gate management process.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide a method and system which allows airlines/airports/CAAs to better achieve their specified operational and business goals and other specified goals with respect to the arrival and departure of a plurality of aircraft at a specified airport.

It is another object of the present invention to present a method and system for the real time management of gate/ramp parking that takes into consideration a wider array of real time parameters and factors than have heretofore been considered. For example, such parameters and factors may include: aircraft related factors (i.e., speed, fuel, altitude, route, turbulence, winds, weather, wake turbulence, crew legality, schedule, etc.), gate related factors (late/early arrivals, boarding congestion, gate departure congestion, ground services, maintenance requirements, passenger loading and offloading, cargo loading, fueling, crew availability, balancing time between arrivals and departures across all gates, departure queuing, etc.) and common asset availability (i.e., runways, taxiways, airspace, ATC services, etc.).

It is a yet another object of the present invention to provide a method and system that will enable airlines to increase their efficiency of operation.

It is a further object of the present invention to provide a method and system that will allow an airline, airport or other aviation entity to enhance its overall operating efficiency, even at the possible expense of its individual components that may become temporarily less effective.

It is still a further object of the present invention to provide a method and system that: (i) analyzes large amounts of real time information and other factors almost simultaneously, (ii) identifies system constraints and problems as early as possible, (iii) determines alternative possible gate/ramp parking assignment sets, (iv) chooses the better of the evaluated gate/ramp parking assignment sets, (v) implements the new solution, and (vi) continuously monitors all updated data to be determine if a better gate/ramp parking assignment solution set becomes available which can be implemented.

Finally, it is the overall object of the present invention to manage gate assignments at a specific airport in real time ("n" hours into the future, where "n" is typically 3 to 6 hours) so as to prevent a gate resource from becoming overloaded or underutilized.

These and other objects and advantages of the present invention will become readily apparent, as the invention is better understood by reference to the accompanying drawings and the detailed description that follows.

SUMMARY OF THE INVENTION

The present invention is generally directed towards mitigating the limitations and problems identified with prior methods used by airlines/airports/CAAs to manage their gate/ramp parking management function. Specifically, the present invention is designed to maximize the efficient use of and throughput of airline aircraft, aircraft gates and parking areas.

In accordance with one preferred embodiment of the present invention, a method for managing and assigning the gate/ramp parking for a plurality of aircraft landing at a specified airport (based upon consideration of specified data regarding the plurality of aircraft, their owner's/manager's operational/business goals, the weather conditions, further specified data regarding the airport, gates, personnel, passenger connections, profit, etc., as well as the operational/maintenance status and utilization of the aircraft, airport gates/ramp parking areas and support functions, and other pertinent data) comprises the steps of: (a) collecting and storing the specified data and operational/business goals, (b) processing the specified aircraft data so as to predict a trajectory for each of the specified aircraft to include landing time, gate arrival time, required ground servicing period, gate departure time, takeoff time, etc. at the specified airport, (c) processing the specified gate/ramp parking data to determine the current and future usage/availability of said gate/ramp parking areas (i.e., a gate trajectory or usage requirements), (d) processing the specified gate operational data to predict trajectories and the loads imposed on the ground resources, support functions and assets that are required once the aircraft reaches the gate (i.e., availability of ramp personnel responsible for gate/ramp parking, tugs, jetway, maintenance, parts, crew, cleaning, baggage, cargo, fueling, departure timing, etc.), (e) calculating the accuracy of said aircraft and gate trajectory prediction data and other specified data (i.e., Figure of Merit) and if said accuracy is high enough, as determined by the operator, assigning each arriving aircraft an initial gate/ramp parking spot at a specified time, (f) computing the goal function value of the initial gate/ramp parking assignment solution set using the specified goals, the specified trajectories and other data of the specified assets, (g) utilizing the goal function optimization process to create alternative, potential gate assignment solution sets and calculating the goal function value for each potential gate assignment solution set (these solutions set scenarios arising as a result of specifiable, realistic changes in the gate assignments, wherein these scenarios include calculations for the changes caused by the changed trajectories and interdependences and other available factors that affect the aircraft and gate trajectories, usage and other gate functions), (h) comparing the goal function value of the initial gate/ramp parking assignment with the values of the alternative, potential gate assignment solution set scenarios generated in the goal function optimization step and selecting the gate assignment solution set associated with the higher goal function value to be the assigned gate assignments, (i) negotiating with the required authorities, if necessary, for validation and approval of the assigned gate/ramp parking assignment solution set, and (j) communicating information about the assigned gate/ramp parking assignment, predicted aircraft arrival time and other pertinent data to all interested parties (i.e., pilots, ramp personnel responsible for the gates/ramp parking and other gate functions and/or systems, maintenance, crew, cleaning, baggage, cargo, fueling, etc.) for implementation of the assigned gate/ramp parking assignments.

In accordance with a further embodiment of the present invention, this method further comprises the step of: (k) continuously monitoring the ongoing changes in the specified data and operational/business goals so as to identify updated specified data and operational/business goals, (l) continuously calculating the goal function value of the current assigned gate/ramp parking assignments using the updated specified data, (m) utilizing the goal function optimization processes above at specified intervals to seek, using the updated specified data, alternative gate assignment solution sets, and (n) if the updated goal function value as compared to the current gate/ramp parking assignment goal function value falls within the acceptable difference as specified by the operator, continuing to use current assigned gate/ramp parking assignments, (o) but if the goal function value of an updated gate/ramp parking assignment solution set implies a higher degree of attainment of the operational/business goals than the goal function value of the current assigned gate/ramp parking beyond a specified difference as defined by the operator, change the current gate/ramp parking assignment to the updated gate/ramp parking assignments, (p) communicating information about the updated assigned gate/parking assignments to the appropriate personnel for implementation of the updated assigned gate/ramp parking assignments, and (q) continuing to monitor the ongoing changes in the specified data and operational/business goals so as to start the process anew.

In accordance with another preferred embodiment of the present invention, a system, including a processor, memory, display and input device, for an aviation entity to manage and assign aircraft gate/ramp parking for a plurality of aircraft with respect to a specified airport (based upon specified data, some of which is temporally varying, and operational/business goals), is comprised of the means for achieving each of the process steps listed in the above methods.

Additionally, the present invention can take the form of a computer program product in a computer readable memory for controlling a processor for managing and assigning aircraft gate/ramp parking for a plurality of aircraft with respect to a specified airport. Such a product is comprised of the means for achieving each of the process steps listed in the above methods.

BRIEF DESCRIPTION OF THE DRAWINGS

FIG. 1 presents a depiction of a typical aircraft flight process.

FIG. 2 presents a typical aircraft arrival/departure structure at an airport.

FIG. 3 presents a simplified depiction of the goal function optimization within the present invention for managing and assigning aircraft gate/ramp parking at a specified airport.

FIG. 4 illustrates samples of the various types of data sets and mathematical functions that are used in the process of the present invention.

FIG. 5 illustrates a sample of the method of the present inventions optimization processing sequence.

DEFINITIONS

ACARS—ARINC Communications Addressing and Reporting System. This is a discreet data link system between the aircraft and the airline. This provides very basic email capability between the aircraft and a limited set of personnel. Also provides access for the pilot to a limited set of operational data. Functionality from this data link source includes operational data, gate/ramp parking spot, weather data, pilot to dispatcher communication, pilot to aviation authority communication, airport data, OOOI data, etc.

Aircraft Situational Data (ASD)—This an acronym for a real time data source (approximately 1 to 5 minute updates) provided by the world's aviation authorities, including the Federal Aviation Administration, comprising aircraft position and intent for the aircraft flying within the controlling agency's airspace.

Aircraft Trajectory—The past, current and future movement or usage of an aircraft defined as a position and time (past, present or future). For example, the trajectory of an aircraft is depicted as a position, time and intent. This trajectory can include in flight positions, as well as taxi positions, and even parking at a specified gate or parking spot.

Airline—a business entity engaged in the transportation of passengers, bags and cargo on an aircraft.

Airline Arrival Bank—A component of a hub and spoke airline's operation where numerous aircraft, owned by a single airline, arrive at a specific airport (hub airport) within in a very short time frame.

Airline Departure Bank—A component of a hub and spoke airline's operation where numerous aircraft, owned by a single airline, depart from a specific airport (hub airport) within a very short time frame.

Airline Gate—An parking area, ramp area, spot, jetway or other structure where aircraft owners/airlines park their aircraft for the purpose of loading and unloading passengers, cargo, etc.

Air Traffic Control System (ATC)—A system to assure the safe separation of aircraft operated by an aviation regulatory authority. Typically, this is a government-controlled agency, but a recent trend is to privatize this function. In numerous countries, the Civil Aviation Authority (CAA) manages this system. In the United States the federal agency responsible for this task is the Federal Aviation Administration (FAA).

Arrival/Departure Times—Refers to the time an aircraft was, or will be at a certain point along its trajectory. While the arrival/departure time at the gate is commonly the main point of interest for most aviation entities and airline customers, the arrival/departure time referred to herein can refer to the arrival/departure time at or from any point along the aircraft's present or long trajectory.

Arrival/departure fix/Corner post—At larger airports, the aviation regulatory authorities have instituted structured arrival/departure points that force all arrival/departure aircraft over geographic points (typically four for arrivals and four for departures, see FIG. 2). These are typically 30 to 50 miles from the arrival/departure airport and are separated by approximately 90 degrees. The purpose of these arrival/departure points or corner posts is so that the controllers can better sequence the aircraft, while keeping them separate from the other arrival/departure aircraft flows. In the future it may be possible to move these merge points closer to the airport or even the runway end. As described herein, the arrival/departure corner post referred to herein will be one of the points where the aircraft merge. Additionally, besides an airport, as referred to herein, an arrival/departure fix/corner post can refer to entry/exit points to any system resource, e.g., a runway, an airport gate, a section of airspace, a CAA control sector, a section of the airport ramp, etc. Further, an arrival/departure fix/corner post can represent an arbitrary point in space where an aircraft is or will be at some past, present or future time.

Asset—To include assets such as aircraft, airports, runways, and airspace, flight jetway, gates, fuel trucks, lavatory trucks, and labor assets necessary to operate any and all of the aviation assets.

Asset Trajectory—The past, current and future movement or usage of any asset (i.e., aircraft, gate, personnel, equipment, etc.) as defined as a position, time (past, present or future). See Aircraft Trajectory.

Automatic Dependent Surveillance (ADS)—A data link surveillance system currently under development. This system, which is installed on the aircraft, captures the aircraft position from the onboard navigation system and then communicates it to the CAA/FAA, other aircraft, etc.

Aviation Authority—Also aviation regulatory authority. This is the agency responsible for aviation safety. In the US, this agency is the Federal Aviation Administration (FAA). In numerous other countries, it is referred to as the Civil Aviation Authority (CAA). As referred to herein, it can also mean an airport authority.

Block Time—The time from aircraft gate departure to aircraft gate arrival. This can be either scheduled block time (schedule departure time to scheduled arrival/departure time as posted in the airline schedule) or actual block time (time from when the aircraft door is closed and the brakes are released at the departure station until the brakes are set and the door is open at the arrival station).

CAA—Civil Aviation Authority. As used herein is meant to refer to any aviation authority responsible for aviation safety, including the FAA within the US.

Cooperative Decision-Making (CDM)—A program between FAA and the airlines wherein the airlines provide the FAA a more realistic real time schedule of their aircraft. For example if an airline cancels 20% of its flights into a hub because of bad weather, it would advise the FAA. In turn, the FAA compiles the data and redistributes it to all participating members.

Common Assets—Assets that must be utilized by the all airspace/airport/runway users and which are usually controlled by the aviation authority (e.g., CAA, FAA, airport). These assets (e.g., runways, ATC system, airspace, etc.) are not typically owned by any one airspace user.

Controlled Asset—An airline asset owned by, and or one that can be controlled by a particular airline. Controlled assets are ones that the airline can exercise a level of control as to its trajectory, movement, usage, and or other operational factors. An example of a controlled asset is an airline's aircraft.

CTAS—Center Tracon Automation System—This is a NASA developed set of tools (TMA, FAST, etc.) that seeks to temporally track and manage the flow of aircraft from approximately 150 miles from the airport to arrival/departure.

Federal Aviation Administration—The government agency responsible for the safety of the U.S. aviation system, including the safe separation of aircraft while they are in the air or on the ground within the United States.

Four-dimensional Path—The definition of the movement of an object in one or more of four dimensions—x, y, z and time.

Gate—a area where an aircraft parks to unload passengers, bags and cargo. Used herein, it can refer to a parking spot where a jetway or outside stairs, etc., is used to deplane and board the passengers. Additionally, this could be a ramp parking area where the aircraft is left for an extended period of time, such as overnight.

Gate Trajectory—The past, current and future movement or usage of a gate defined as a position and time (past, present or future) and availability (i.e., if an aircraft is parked at the gate or not, if the gate is operable, etc.).

Goal Function—a method or process of optimization and measurement of the degree of attainment for a set of specified goals. As used herein, a optimization method or process to evaluate the value of the current scenario against a set of specified goals, generate various alternative scenarios, with these alternative scenarios, along with the current scenario then being assessed with the goal attainment assessment process to identify which of these alternative scenarios will yield the highest degree of attainment for a set of specified goals. The purpose of the Goal function is to find a solution that "better" meets the specified goals (as defined by the operator) than the present condition and determine if it is worth (as defined by the operator) changing to the "better" condition/solution. This is always true, whether it is the initial run or one generated by the continuous monitoring system. In the case of the continuous monitoring system (and this could even be set up for the initial condition/solution as well), it is triggered by some defined difference (as defined by the operator) between the how well the present condition meets the specified goals versus some "better" condition/solution found by the present invention. This can be done by assigning a "value" of how well a certain solution set meets the operator's goals. Once the Goal function finds a "better" or higher value condition/solution, that it determines is worth changing to, the present invention translates said "better" condition/solution into some doable task and then communicates this to the interested parties, and then monitors the new current condition to determine if any "better" condition/solution can be found and is worth changing again.

Hub and Spoke Airline Operation—An airline operating strategy whereby passengers from various cities (spokes) are funneled to an interchange point (hub) and connect with flights to various other cities. This allows the airlines to capture greater amounts of traffic flow to and from cities they serve, and offer smaller communities one-stop access to literally hundreds of nationwide and worldwide destinations.

IFR—Instrument Flight Rules. A set of flight rules wherein the pilot files a flight plan with the aviation authorities responsible for separation safety. Although this set of flight rules is based on instrument flying (e.g., the pilot references the aircraft instruments) when the pilot cannot see at night or in the clouds, the weather and the pilot's ability to see outside the aircraft are not determining factors in IFR flying. When flying on an IFR flight plan, the aviation authority (e.g., ATC controller) is typically responsible for the separation of the aircraft.

Long Trajectory—The ability to look beyond the current flight segment to build the trajectory of an aircraft for x hours (typically 24) into the future. This forward looking, long trajectory may include numerous flight segments for an aircraft, with the taxi time and the time the aircraft is parked at the gate included in this trajectory. For example, given an aircraft's current position and other factors, it is predicted to land at ORD at 08:45, be at the gate at 08:52, depart the gate at 09:35, takeoff at 09:47, deviate for weather, hold for 7 minutes and land at DCA at 11:20 and be at the DCA gate at 11:29, depart the DCA gate at 12:15, hold for 30 minutes, takeoff at 12:45 and land at DFW at 1:45. At each point along this long trajectory, numerous factors can influences and change the trajectory. The more accurately the process can predict and account for these factors, the more accurately the prediction of each event along the long trajectory. Further, within the present invention, the long trajectory is used to predict the location of an aircraft at any point x hours into the future.

OOOI—A specific aviation data set (Out, Off, On and In) comprised of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at the hub airport by the hub airline. This proprietary device allows the airline's operational people on the ground to display the airborne aircraft in the vicinity (up to approximately 150 miles) of the airport where it is installed. This system has a local capability to predict landing times based on the current flow of aircraft, thus incorporating a small aspect of the trajectory prediction. Unfortunately, this update to the aircraft trajectory comes too late to effect any meaningful change in coordination of the airline's other assets.

Strategic Tracking—The use of long-range information (current time up to "x" hours into the future, where "x" is defined by the operator of the present invention, typically 24 hours) to determine demand and certain choke points in the aviation system along with other pertinent data as this information relates to the trajectory of each aircraft, gate, etc.

System Resource—a resource like an airport, runway, gate, ramp area, or section of airspace, etc, that is used by all assets, (e.g., aircraft). A constrained system resource is one where demand for that resource exceeds capacity. This may be an airport with 70 aircraft that want to land in a single hour, with arrival/departure capacity of 50 aircraft per hour. Or it could be an airport with 2 aircraft wanting to land at the same exact time, with capacity of only 1 arrival/departure at a time. Or it could be a hole in a long line of thunderstorms that many aircraft want to utilize. Additionally, this can represent a group or set of system resources that can be track and predicted simultaneously. For example, an arrival/departure corner post, runaway and gate represent a set of system resources that can be track and predictions made as a combined set of resources to better predict the arrival/departure times of aircraft.

Tactical Tracking—The use of real time information (current time up to "n1" minutes into the future, where "n1" is defined by the operator of the present invention, typically 1 to 5 hours) to predict asset trajectories.

Trajectory—See aircraft trajectory and four-dimensional path above.

VFR—Visual Flight Rules. A set of flight rules wherein the pilot may or may not file a flight plan with the aviation authorities responsible for separation safety. This set of flight rules is based on visual flying (e.g., the pilot references visual cues outside the aircraft) and the pilot must be able to see and cannot fly in the clouds. When flying on a VFR flight plan, the pilot is responsible for the separation of the aircraft when it moves.

Uncontrolled Asset—An asset that is not owned by, and or one that cannot be controlled by a user airline. Uncontrolled assets are ones that the user airline cannot exercise any level of direct control as to movement, usage, and or other operational factors. An example of an uncontrolled asset is an airline's competitor's aircraft.

User Airline—The term user airline and airline be will be used interchangeably to denote an airline utilizing the present invention for enhancing its operational effectiveness and efficiency.

DESCRIPTION OF THE PREFERRED EMBODIMENT

Referring now to the drawings wherein are shown preferred embodiments and wherein like reference numerals designate like elements throughout, there is shown in the drawings to follow the decision steps involved in a method of the present invention. This method effectively manages the gate assignments for a plurality of aircraft arrivals into an airport.

As discussed above, the overall goal of the present invention is to increase gate, aircraft and other asset efficiency through the real time management of the gate/ramp parking asset from a system perspective. It is important to note that the present invention is a unique, novel combination of several process steps. The various processes involved in these steps include:

1. A data collection process that collects all of the specified data necessary for the specified airport, and the selected set of assets, aircraft and gates applicable to this specified airport.
2. An asset trajectory tracking (i.e., three spatial directions and time) process that continuously monitors the current position and status of all aircraft, gates and other assets.
3. An asset trajectory predicting process that inputs the asset's (aircraft gates and other assets) current position and status (speed, direction, etc.) into an algorithm which predicts the asset's future position and status for a given specifiable time or a given specifiable position.
4. An initial gate assignment process that assigns gates based on the predicted aircraft landing time, gate availability, gate restrictions, passenger connections, etc.
5. A goal function value calculation process that assesses how well the current gate assignment solution set meets the operator's/airline's/airport's/CAA's specified operational/business and other specified goals based on the trajectory and status of these specified aircraft, gates and other assets.

6. A goal function optimization gate assignment process that generates various alternative solutions for the set of aircraft scheduled to arrive at the specified airport and the set of gates available at that airport and calculates each scenario's goal function value, with the highest goal function value corresponding to the assignment set of gates which yields the highest degree of attainment (i.e., optimized) of the operator's/airline's/airport's/CAA's operational/business and other specified goals. (these solution set scenarios arising as a result of specifiable, realistic changes in the gate assignments, wherein these scenarios include calculations for the changes caused by the changed trajectories and interdependences and other available factors that affect the aircraft and gate trajectories, usage and other gate functions).
7. A selection process that chooses the gate/ramp parking assignment solution set that yields the highest degree of attainment (i.e., optimized) of the operator's/airline's/airport's/CAA's operational/business and other specified goals.
8. A negotiation, validation and approval process, as required, which entails an airline/airport/CAA or other outside agency approving the assignment of these new, gate assignments for each of the specified aircraft.
9. A communication process which allows the airline/airport/CAA, other system operator or automated process to communicate the arrival gate assignments, predicted aircraft arrival times and pertinent data to the effected personnel and systems so as to implement the assigned gate/ramp parking assignments.
10. A closed loop monitoring process, which involves continually monitoring the specified data and updating the trajectories of the specified assets. Using this updated data, the monitoring process continuously measures the goal function "value" of the current gate assignment solution. Further, the goal function optimization process continuously generates alternative gate assignment scenarios using the updated information as it becomes available. When the difference between the goal function value of the current gate assignments and the goal function value of the highest alternative gate assignment scenarios crosses a threshold, as defined by the operator, the airline/airport/CAA or other system operator can be notified, and/or the present invention can assign and communicate the new gate/ramp parking assignments so as to implement the assigned gate/ramp parking assignments and then the process begins anew.

FIG. 3 provides a flow diagram that represents a simplified view of decision steps involved in the control of an airport gate whose gate/ramp parking assignments are sought to be optimized. It denotes (step 301) how the value of the current gate/ramp parking assignments must first be determined for the initial gate assignment solution set, i.e., the starting point.

While in reality, the selection of the initial aircraft gate assignment, and the next and the next could be arbitrary; one method of selection could be based on that the first aircraft to land is assigned the first gate to be available. The initial gate assignment is only used as a starting point and baseline to measure the goal function value of the alternative gate/ramp parking assignments as generated by the goal function optimization process (step 302).

In step 302, this method is seen to evaluate alternative gate/ramp parking assignment solution sets to determine if a gate/ramp parking assignment solution set can be found that better meets the operational, business, safety and efficiency goals of the operator. If this cannot be done, this method involves then jumping to step 305, which communicates the starting point gate assignments to all interested parties.

But, if alternative gate/ramp parking assignments can better meet the specified operational/business goals of the operator, the value of the new gate/ramp parking assignments must be compared to the benefit produced (step 303). If the value difference does not justify the changes to the current gate/ramp parking assignments (i.e., the difference between the current gate assignment goal function value and the new gate/ramp parking assignments goal function value does not cross the threshold value as determined by the operator), the process must once again default to step 305.

Conversely, if the goal function value of new gate/ramp parking assignment solution set is high enough, the method then entails assigning the new gate/ramp parking assignments and then implementing the new gate/ramp parking assignments by communicating the new gate/ramp parking assignments goals to all interested parties (step 304).

Finally, the method involves monitoring all of the specified data for the aircraft and specified airport (gates, personnel, etc.) to determine if each of the aircraft and gate trajectories will meet their current/new gate/ramp parking assignments goal (step 306). It further involves continually evaluating the goal function "value" of the current gate assignment solution set using updated data and comparing it against the value of alternative solution sets based on the latest specified and updated data which are continuously generated by the goal function optimization process.

If the operator's goals are not being met, or the value of the goal function for an alternative gate/ramp parking assignment solution set using the updated data differs by a threshold amount from the goal function value of the current gate assignment solution set, the updated gate/ramp parking assignments are communicated to the appropriate personnel for implementation and the entire process is restarted.

The method of the present invention continuously analyzes aircraft, gate and other specified data from present time up to "n" hours into the future, where "n" is defined by the operator/airline/airport/CAA. The overall time frame for each analysis is typically twenty-four hours, with the embodiment of the present invention described herein actually assigning the aircraft gate/ramp parking spots between three and five hours into the future and then continuously monitoring the aircraft and other assets.

The three to five hour time window prior to landing is felt to be the current optimal time to assign gates based on the fact that earlier than three hours passengers and bags begin to arrive and need a gate at which to assemble, while prior to five hours the accuracy of the data begins to deteriorate. As data accuracy increases and ground handling processes improve, this gate assignment process time window can be expanded.

Further, until such time as newer processes allow, within the current art, gate assignments under three hours prior to landing begins to have negative effects, such as reduced product quality (making passengers move to a new gate) and increased labor costs (coordination of the gate change and labor required to move the bags collected at the original gate).

This method is seen to avoid the pitfall of sub-optimizing particular parameters. The method of the present invention accomplishes this by assigning weighting values to various factors within the goal function that comprise the airline/airport/CAA's gate/ramp parking assignment operational and other specified goals. Additionally, while the present invention is capable of providing a linear (i.e., gate by gate optimization) solution to the optimized gate/ramp parking assignment of a plurality of aircraft approaching an airport, it is recognized that a multi-dimensional (i.e., optimize for the whole set of aircraft, gates, other airline assets and needs, airport assets, etc.) gate/ramp parking assignment solution provides a solution that can better meet the operational/business goals of the user airline or system operator.

For hub airports, the gate assignment process can be a daunting task as thirty to sixty of a single airline's aircraft (along with numerous aircraft from other airlines) are scheduled to arrive at the hub airport in a very short period of time. The aircraft then exchange passengers, are serviced and then take off again. The departing aircraft are also scheduled to takeoff in a very short period of time. Typical hub operations are one to one and a half hours in duration and are repeated eight to twelve times per day.

FIG. 4 illustrates samples of the various types of data sets, mathematical functions and processes of the present invention that are used in this decision making process, these include: air traffic control objectives, generalized surveillance, aircraft kinematics, communication and messages, airspace structure, airspace and runway availability, user requirements (if available), labor resources, aircraft characteristics, aircraft arrival/departure times, weather, gate availability, maintenance, other assets, and operational/business goals.

FIG. 5 illustrates the optimization processing sequence of the present invention. In step 501, a set of aircraft and gates at a specified airport are selected whose gate assignments into a specified airport, during a specified "time window," are sought to be optimized. In one embodiment of the present invention, the aircraft from outside this window are not submitted for optimization in this scheduling process, but they are taken into account as far as they may impose some limitations on those who are in the selected set of aircraft.

In step 502, all of the specified data necessary to optimize the gate assignment process is collected. Next, in step 503, the positions and future movement plans for all of the aircraft, gates and other assets, etc. is identified with input from databases which include Automatic Dependent Surveillance (ADS), FAA's Aircraft Situational Data (ASD), those of the airlines (if available) and any other information (e.g., weather) available as to the position and intent of these assets. The calculation of the trajectories for the selected set of aircraft, gates, etc., can be computed using an assortment of relatively standard software programs (e.g., "Aeralib," from Aerospace Engineering & Associates, Landover, Md. and/or USPTO Publication Ser. No. US-2003-0050646-A1—"Method and System For Tracking and Prediction of Aircraft Trajectories") with inputted information for each asset that includes information such as filed flight plan, current position, altitude and speed, data supplied from the airline/user/pilot, usage, etc.

In step 504, a predicted aircraft landing/gate arrival time is calculated based on the calculated trajectories for the specified set of aircraft. Then, in step 505, a Figure of Merit is calculated and when the Figure of Merit exceeds a specified threshold, the predicted landing times and other data is used for an initial set of gate assignments for the aircraft. As discussed above, this initial gate assignment process can be accomplished in many different ways since it represents the baseline, or a starting point from which to begin and measure the value of alternative gate assignment solution sets. Therefore, the present invention computes the goal function value of the for the initial gate assignment solution set. This value is a measure of how well this set of gate assignments meets the operator's or other specified operational/business goals.

In step 506, this goal function is optimized with respect to these initial gate assignments by identifying potential changes to these gate assignments so as to increase the value of the solution as determined by the goal function. The solution space in which this search is conducted has requirements place upon it which ensure that all of its potential solutions are operational. These requirements include those such as, but not limited to: no two aircraft occupy the same gate at the same time slot, certain size aircraft can only park at certain gates, etc.

This goal function can be defined in many ways. However, one preferred method is to define it as the sum of the weighted components of the various factors or parameters (e.g., such factors that need to be individually weighted include: utilizing all of the gates efficiently, less passengers miss their connections, less taxi time for late aircraft, that no aircraft lands and need wait for a gate, that when departing, no aircraft will block another, that when deplaning or loading the aircraft there is less confusion for the passengers that are boarding another aircraft nearby, etc.) that are used to measure how well a gate/ramp parking assignment solution set meets the specified operational/business goals.

In step 507, once all of the alternative gate assignment solution sets are evaluated, the one that best meets the specified operational/business goals is identified and gate/ramp parking assignments are completed.

In step 508, this new set of gate assignments is communicated to all interested parties for implementation.

Even after these new gate assignments are implemented, the status of the specified aircraft, gates and other assets continues to be monitored, trajectories calculated, predictions made, alternative gate scenarios generated, goal function values calculated, etc. The goal function value of the current gates assignments is calculated using the updated data and is continuously compared to potential alternative gate/ramp parking scenarios so as to identify a gate/ramp parking assignments solution set that better meets the specified operational/business goals. Therefore, if the current gates assignments, calculated using the updated data, crosses a specified threshold amount from the goal function value of one of the alternative gate scenario sets, updated gate assignments are made or the entire process begins anew and appropriate adjustments are made to the specified aircraft's gate assignments.

One must also be aware that although the present invention is capable of continuously changing the actual gate/ramp parking assignments, this would be impracticable. Therefore, one of the weighted parameters could be a penalty or negative value for changing the assigned gate/ramp parking assignments once they have been communicated to all pertinent personnel for implementation. This could be one method of determining an acceptable difference as to when to act between the current gates assignment goal function value and the potential alternative gate/ramp parking scenarios goal function value.

The present invention's ways of optimizing an airport's gate/ramp assignments differs from the current industry practices in several, important ways. First, many of the current airline gate/ramp parking assignment processes are often done too early (i.e., months in advance) and only manually changed on an individual aircraft by aircraft basis when things beginning to deteriorate. Or, as is done by some airport, the process is done too late, after the aircraft land.

Some of the key elements inherent within the present invention are timing of the gate/ramp parking assignment, an increase in the number of parameters considered, the accuracy of the specified data, better prediction of the asset trajectories; all of which are utilized in a goal function optimization process.

In one embodiment of the present invention, the gate assignment process is accomplished as soon as the accuracy of the specified data is high enough, but prior to the ramp personnel starting to collect and store baggage or prior to too many passengers arriving at the airport for the next flight of the aircraft. The goal is to assign the gate or parking spot as late in the process a possible, which allows the system to have access to a more stable data set (the likelihood of trajectory changes is low), but not too late in the process, so as the quality and cost of other process, i.e., bag collection and/or passenger waiting process or product quality, is lowered In the application of the present invention in the year 2004 time frame, this gate assignment timing is thought to be three to five hours prior to the aircraft actually arriving at the gate. In the three to five hour window prior to landing, the accuracy of the specified data is high enough, while few, if any passengers, bags or cargo has arrived at the specified airport for the next flight of the aircraft.

As described above, the accuracy of the asset trajectories is important, especially the aircraft landing and gate arrival time predictions. It is obvious that if the trajectories are too inaccurate, the quality of any solution based on these trajectories will be less than might be desired. Therefore, after any trajectory is built, the present invention must determine the accuracy of the specified trajectory.

The present invention determines the accuracy of all trajectories (aircraft, gates, personnel, etc.) based on an internal predetermined set of rules and then assigns a Figure of Merit (FOM) to each trajectory. For example, if an aircraft is only minutes from landing, the accuracy of the estimated landing time, and therefore the FOM is very high. There is simply too little time for any action that could alter the landing time significantly. Conversely, if the aircraft has filed its flight plan (intent), but has yet to depart Los Angeles for Atlanta, there are many actions or events in the current environment that would decrease the accuracy of the predicted arrival time.

It is easily understood that one aspect of the FOM for these predictions is a function of time. The earlier in time the prediction is made, the less accurate the prediction will be and thus the lower its FOM. The closer in time the aircraft is to landing, the higher the accuracy of the prediction, and therefore the higher its FOM. Effectively, the FOM represents the confidence the present invention has in the accuracy of the predicted trajectories.

Along with duration of the period being predicted by a calculated trajectory, other factors that determine a FOM include: available of wind/weather data, availability of information from the pilot, maintenance, etc. An additional method to improve the FOM is to drive the trajectories to a specific goal as is done in U.S. Pat. No. 6,721,714 entitled, "Method and System for Tactical Airline Management" issued Apr. 4, 2004 and U.S. Pat. No. 6,463,383 entitled, "Method And System For Aircraft Flow Management By Airlines/Aviation Authorities" issued Oct. 8, 2002.

Once the trajectories are built and their FOMs are determined high enough, the goal function optimization process can begin. Such a computation of the goal function optimization often involves an algorithm that assigns a numerical value to each of its parameters based on the operator's goals. Often these parameters are interdependent, such that changes in one can negatively affect another.

If the goal function is defined simply as the sum of the parameters for the various aircraft whose operation and safety are sought to be optimized, we have what can be thought as a linear process. Alternatively, if we define our goal function to be a more complicated, or nonlinear, function so that we take into consideration how changes in one aircraft's predicted gate departure time might necessitate a change in another aircraft's gate assignment, it is less clear as to how to better optimize the goal function. However, as is well known in the art, there exist many mathematical techniques for optimizing even very complicated goal functions. It is further recognized that a nonlinear (i.e., optimize for the whole set of aircraft, gates, airport assets, personnel, etc.) solution will often provide a solution for the total operation of the airport gates, including all aspects of the aircraft arrival/departure flow that better meets the specified operational/business goals.

To provide a better understanding how this goal function process optimization routine may be performed, consider the following mathematical expression of a typical gate scheduling problem in which a number of gate assignments, $1 \ldots n$, are expected to be assigned at time values $t_1 \ldots t_n$. They need to be rescheduled so that:

The time difference between the gate departure of outbound aircraft and gate arrival of inbound aircraft is not less than some minimum, $\Delta$;

The number of gate re-assignments is as little as possible;

Some aircraft may only be parked at specific gates.

We use $d_i$ to denote the change (negative or positive) our rescheduling brings to $t_i$. We may define a goal function that measures how "good" (or rather "bad") our changes are for the whole gate pool as $$G_1=\Sigma_i|d_i/r_i|^k$$

where $r_i$ are application-defined coefficients, putting the "price" at changing each $t_i$ (if we want to consider rescheduling the i-th gate "expensive", we assign it a small $r_i$, based, say, on safety, airport capacity, arrival/departure demand and other factors), thus effectively limiting its range of adjustment. The sum runs here through all values of i, and the exponent, K, can be tweaked to an agreeable value, somewhere between 1 and 3 (with 2 being a good choice to start experimenting with). The goal of the present invention is to minimize $G_1$ as is clear herein below.

Next, we define the "price" for a departure and arrival gate being assigned gate too close in time to each other. For the reasons, which are obvious further on, we would like to avoid a non-continuous step function, changing its value at $\Delta$. A fair continuous approximation may be, for example, $$G_2=\Sigma_{ij}P((\Delta-|d_{ij}|)/h)$$

where the sum runs over all combinations of i and j, h is some scale factor (defining the slope of the barrier around $\Delta$), and P is the integral function of the Normal (Gaussian) distribution. $d_{ij}$ stands here for the difference in time of arrival/departure between both gate, i.e., $(t_i+d_i)-(t_j+d_j)$.

Thus, each term is 0 for $|d_{ij}>>\Delta+h$ and 1 for $|d_{ij}|<<\Delta-h$, with a continuous transition in-between (the steepness of this transition is defined by the value of h). As a matter of fact, the choice of P as the Normal distribution function is not a necessity; any function reaching (or approaching) 0 for arguments <<−1 and approaching 1 for arguments >>+1 would do; our choice here stems just from the familiarity.

A goal function, defining how "bad" our rescheduling (i.e., the choice of d) is, may be expressed as the sum of $G_1$ and $G_2$, being a function of $d_1 \ldots d_n$:

$$G(d_1 \ldots d_n)=K\Sigma_i C_i d_i^2+\Sigma_{ij}P((\Delta-|d_{ij}|)/h)$$

with K being a coefficient defining the relative importance of both components. One may now use some general numerical technique to optimize this function, i.e., to find the set of values for which G reaches a minimum. The above goal function analysis is applicable to meet many, if not all, of the individual goals desired by an airline/aviation authority.

To illustrate this optimization process, it is instructive to consider the following goal function for n gate:

$$G(t_1 \ldots t_n)=G_1(t_1)+ \ldots +G_n(t_n)+G_0(t_1 \ldots t_n)$$

where each $G_i(t_i)$ shows the penalty imposed for the i-th gate arriving at time $t_i$, and $G_0$—the additional penalty for the combination of arrival times $t_1 \ldots t_n$. The latter may, for example, penalize when two gate take the same arrival slot.

In this simplified example we may define $$G_i(t)=a\times(t-t_S)^2+b\times(t-t_E)^2$$

so as to penalize an gate for deviating from its scheduled time, $t_S$, on one hand, and from its estimated (assuming currents speed) arrival time, $t_E$, on the other.

Let us assume that for the #1 gate $t_s=10$, $t_e=15$, a=2 and b=1. Then its goal function component computed according to the equation above will be a square parabola with a minimum at t close to 12 (time can be expressed in any units, let us assume minutes). Thus, this is the "best" gate assignment for that gate as described by its goal function and disregarding any other gate in the system.

With the same a and b, but with $t_S=11$ and $t_E=14$, the #2 gate's goal function component looks quite similar.

Now let us assume that the combination component, is set to 1000 if the absolute value $(t_1-t_2)<1$ (both gate occupy the same slot), and to zero otherwise. The minimum (best value) of the goal function is found at $t_1=11$ and $t_2=12$, which is consistent with the common sense: both gate are competing for the $t_2=12$ minute slot, but for the #1 gate, the $t_1=11$ minute slot is almost as good. One's common sense would, however, be expected to fail if the number of involved gate exceeds three or five, while this optimization routine for such a defined goal function will always find the best goal function value.

Finally, to better illustrate the differences between the present invention and the current art used for managing an airport's gate/ramp parking, consider the following examples:

Example 1—Consider the problem of 5 aircraft (Flights A, B, C, D, and E) approaching Atlanta airport, which need to park at gates 1 through 5.

In the current art, most gate assignments are scheduled weeks or months in advance. Unfortunately, as can be expected given the many independent decisions and variance that exists in the aircraft flow within the current art, the actual daily operation differs from the schedule, sometimes significantly.

This randomness and variance leads to a flight by flight set of unique goals that are impossible to meet, or even consider weeks in advance. For example, these unique goals might include that gate 1 is planned to be occupied 13 minutes longer than normal today because the flight occupying gate 1 arrived late. Or that Flight A needs 55 minutes of maintenance, but only was originally scheduled on the gate for 35 minutes, which will impact the next aircraft arrival at the gate. Or that if Flight B can get to a gate 6 minutes early, it will prevent the flight crew from being illegal for the next flight. Or that Flight C is 20 minutes late. These unique goals are specific to today's operation and this set of unique goals changes each and every day.

But along with the unique goals, there are other general goals that Flights A, B, C, D and E and every aircraft want to meet every day, all day. These general goals include that all aircraft have a gate to park when they land, all flights are on schedule, all personnel and equipment necessary to service the aircraft are available when the aircraft reaches the gate, all passengers make their connections, the time on the gate is minimum, no aircraft blocks or delays another aircraft when departing and the aircraft are in the correct queue for departure such that they arrive at the next destination on schedule, etc.

Using the present invention, most if not all of the above operational/business goals are known only hours before the aircraft lands and needs a gate. Therefore, in one embodiment of the present invention this data is processed with a set of weighting factor applied to each parameter (as set by the operator) where a higher number indicates a higher attainment of the specified operational/business goals, to determine a goal function value for each possible gate/ramp parking assignment solution set that is evaluated.

Using this information, the goal function optimization process would examine the possible gate/ramp parking assignment solution sets to find one that better meets the operational/business goals of the operator. In this example of one embodiment of the present invention, the goal function optimization would seek the gate/ramp parking assignment solution set that has the higher goal function value.

Further, in this simple example of 5 aircraft and 5 gates, it is easy to calculate that there are 120 possible gate/ramp parking assignment solution sets. Manually examining even this simple example to find a more optimal gate/ramp parking assignment solution set that better meets many of the specified goals is a difficult task. But when you expand the arrival bank to 50 aircraft, many with numerous unique goals and consider that 10 to 12 banks of such aircraft arrive at a hub airport each day, the problem of finding an acceptable gate solution for each aircraft takes much longer.

This is why, in the current art, airlines assign gates weeks to months in advance, and alter the gate assignment if difficulties arise. But when the randomness and variance, so evident in the aircraft arrival flow within the current art, begin to deteriorate the schedule, changes are required. Since these unique goals are unknown when the schedule is written, the only way to account for these unknowns is by adding buffer time (empty gates or extra flight time) and trying to deal with any problems once they develop.

To buffer the current gate assignments, airlines routinely add minutes to both their schedule block time and scheduled gate time to deal with this randomness. This added time is a very expensive way to try and solve the problem. Further, dealing with a problem, any problem after the problem occurs makes the solution much more difficult.

For example, since in the current art many of these unique parameters are not tracked or considered, the gate manager only learns that there is a problem in the last 30 minutes of flight or even after the aircraft lands. So even with additional "production time" or buffer time added into the schedule, the flight arrives, and the gate, and all of the other gates are already occupied and the flight, and its passengers sit, waiting for a gate, 10, 20 or even 30 minutes.

That said, tactically assigning gates 3 to 5 hours prior to landing, provides a more optimal solution. Not only can the gate/ramp parking assignment solution account for the general goals, but it can also account for the unique goals of each aircraft in the arrival flow. The use of a computer and a software based goal function optimization process, inherent within one embodiment of the present invention, allows an airline to not only tactically manage its gate process tactically, but encompass the unique goals necessary to better meet an airline's operational/business goals.

In this example, let us first start by collecting the specified goals and data. First is the goal. In this example, the goal is to try to have a gate available as soon as each aircraft arrives. Using the goal function parameter, we will assign a value of zero if the aircraft has to wait for a gate and one if the aircraft does not have to wait for the gate, Further, as discussed above, the unique goals include that gate 1 is free at 1305Z, Flight A requires 55 minutes of maintenance at the gate, Flight B needs to be at gate 6 minutes early to prevent the flight crew from being illegal for the next flight, Flight C is 20 minutes late and Flights D and E have no special requirements. Additionally:

All flights usually are scheduled for 35 minutes on the gate.

Flight A is scheduled to be at the gate at 1255, and will be at the gate at 1255

Flight B is scheduled to be at the gate at 1245, but will be at the gate at 1237

Flight C is scheduled to be at the gate at 1255, but will be at the gate at 1315

Flight D is scheduled to be at the gate at 1250, but will be at the gate at 1255

Flight E is scheduled to be at the gate at 1240, but will be at the gate at 1251

Gate 1 is open at 1305, with the next aircraft scheduled to arrive at 1355

Gate 2 is open at 1245, with the next aircraft scheduled to arrive at 1405

Gate 3 is open at 1235, with the next aircraft scheduled to arrive at 1330

Gate 4 is open at 1253, with the next aircraft scheduled to arrive at 1345

Gate 5 is open at 1250, with the next aircraft scheduled to arrive at 1340

Next, once the data is determined stable enough (i.e., the Figure of Merit is high enough) the initial set of gate assignments is set. Since the initial set of gate assignments can be somewhat arbitrary, the present invention can assign the gates as follows:

Flight A assigned to gate 1
Flight B assigned to gate 2
Flight C assigned to gate 3
Flight D assigned to gate 4
Flight E assigned to gate 5

In this example, the present invention is trying to optimize the gate assignment function such that none of the 10 aircraft have to wait for a gate. As can be seen from the initial gate assignments and the collected data there are some problems with the initial gate assignments. Flight A will arrive at 1255, but gate 1 will not be available until 1305 (a 10 minute wait), and Flight A, because of maintenance, will not be ready to depart until 55 minutes after arriving at the gate at 1400, which will cause the next aircraft arriving at 1355 to wait for the gate. Flight B will arrive at 1237, but gate 2 is not available until 1245, which will make the crew illegal for their next leg. Flight C will arrive at gate 3 at 1315 and with a 35 minute gate time will depart at 1350, which will cause the next aircraft to wait 20 minutes for a gate. The gates for Flights D and E are open when they arrive and the aircraft have no special requirements or down line conflicts with the next arriving aircraft. The above gate assignment leads to a goal function value of 6, since 4 of the 10 aircraft will have to wait for a gate.

Using the goal function process, the present invention will set a value of the initial gate assignment and then work to seek a gate assignment solution with a higher goal function value. After searching the possible gate assignment solution sets, the goal function optimization process determines that the following gate assignment solution set better meets the operator's goal since no aircraft will land and be required to wait for a gate.

Flight A assigned to gate 2
Flight B assigned to gate 3
Flight C assigned to gate 1
Flight D assigned to gate 4
Flight E assigned to gate 5

Using this gate assignment solution set, Flight A will arrive at gate 2 at 1255, the gate will be available at 1245, and, after 55 minutes of maintenance, it will be ready to depart at 1350, which will not interfere with the next aircraft arriving at 1405. Flight B will arrive at gate 3 at 1237 and gate 3 is available at 1235, which will make the crew legal for their next leg. Flight C will arrive at gate 1 at 1315 and with a 35 minute gate time will depart at 1350, which will not interfere with the next aircraft. The gates for Flights D and E are open when they arrive and the aircraft have no special requirements or down line conflicts with the next arriving aircraft. The above gate assignment leads to a goal function value of 10, since none of the 10 aircraft will have to wait for a gate.

Once the gate assignments are decided, the present invention would communicate the gate assignments to the appropriate personnel (pilot, maintenance, passengers, etc.) for implementation. For example, the pilot needs to know towards witch gate to taxi, the ramp and maintenance personnel need to which gate to go to meet the aircraft and the passengers need to know where to go to board their flights.

Finally, the present invention would continue to monitor the specified goals and data for changes, calculate the current goal function value based on the updated data and determine the need for reassigning and implementing updated gates.

Example 2—When aircraft in a hub bank depart, they often depart at or close to the same time. In the current art, without tactical departure information considered in the gate assignment process, these aircraft routinely block each other as they push back from the gate. For example, aircraft #1 pushes back from gate A at 1230. Aircraft #2, which is to the right of #1 at gate B, pushes back at 1232, #3, to the right of #2, at 1234 and #4, to the right of #3, at 1236. Because of the ramp configuration, all aircraft must turn to their right to taxi to the runway and with the gates so close together, aircraft must wait until the aircraft to its right moves.

This means that even though aircraft #1 is ready to taxi soon after it pushes from gate A, it must wait for #2 to leave from gate B, which must wait for #3 to depart, which must wait for #4 to turn out. In other words, assuming that all aircraft require the same amount of time to push from the gate and prepare to taxi, Aircraft #1 must wait a minimum of 6 extra minutes to begin taxi, #2 must wait an extra 4 minutes and #3 an extra 2 minutes. And further decreasing the efficiency of the operation the first come, first serve process of the ATC system assigns the first takeoff to aircraft #4, the first aircraft in line and the first to taxi. This further delays aircraft #1, #2 and #3.

In the method of the present invention, the predicted departure times are used in the gate assignment goal function process to determine a more efficient gate assignment solution. In this example, assuming all other parameters are equal, the gate assignments would be reversed, such that aircraft #4 would be assigned gate A, aircraft #3 assigned gate B, etc. Then as the aircraft depart, aircraft #1, the first to depart, would be the on to the farthest right and immediately able to taxi after the push back process. In fact, there would be no taxi delay for any of the 4 aircraft.

Example 3—Given the increased predictability of the aircraft arrival/departure time based on the tactical gate assignment, the process of the present invention helps the airlines/users/pilots to more efficiently sequence the ground support assets such as gates, fueling, maintenance, flight crews, etc.

For example, less gate changes are required, less labor is needed to make such changes, and the entire gate assignment arrival process becomes more predictable and stable, thus allowing the airline's secondary processes (crews, cleaners, fuelers, etc.) to increase efficiency.

Example 4—Hub operations typically require a large number of actions to be accomplished by an airline in a very short period of time, thus requiring the maximum utilization of the assets. One such group of important assets is the gates. Typically in a tightly grouped hub operation, the departures of an airline's aircraft from the last hub operation compete for gate assets with the arrivals of the same airline for the next hub operation. If an aircraft is early or late, it can have a negative impact on the passengers and the throughput of the airport. For example, if the winds are such that many of the aircraft in an arrival bank arrive 20 minutes early, more often than not, these aircraft must wait for a gate, even though some gates are available.

By only assigning gates in the 3 to 5 hour window prior to arrival, the gate assignment process can take into account the early arrivals and assign gates to try and accommodate all of the early arriving aircraft.

Further, if all of the arriving aircraft cannot be immediately assigned gates when they land, by identifying this gate constraint much earlier in the arrival process (3 to 5 hours or more prior to landing), some aircraft can be held at their departure point or slowed enroute (see U.S. Pat. No. 6,463,383—"Method and System for Aircraft Flow Management by Airlines/Aviation Authorities").

Example 5—Further, one can look at the example of the impact of a tactical gate assignment process to the aircraft passenger boarding. If a flight on gate A is 5 hours late, it can happen that it is boarding at the exact same time as an on schedule departure at gate B. If both of these flights are full, large international aircraft (B747), the number of people trying to board is well in excess of 600 people. If these two gates are close together, the boarding lines can cross, creating confusion for the passengers and airline personnel. Additionally, the passengers of the late flight are already stressed and by boarding both aircraft simultaneously, right next to each other, more stress is added to the passengers.

Example 6—Numerous aviation delays are caused by the unavailability of an arrival gate or parking spot once the aircraft lands. As discussed, current airline/airport gate management techniques typically assign gates either too early (i.e., months in advance) and only make modifications after a problem develops, or too late (i.e., when the aircraft lands). Many passengers are familiar with the frustration of landing and waiting for their gate to become available. This leads to situations where the gate for a particular aircraft is not available, yet other gates are empty, which is even more frustrating since the passengers can usually see the open gates and cannot understand why they cannot park at the open gate.

Unfortunately, if one waits until the aircraft lands to seek an alternative gate, it is a difficult task and passengers don't realize the complexity and disruption of changing a gate assignment after the aircraft lands. For example, passengers for the aircraft's next flight are waiting at the initial gate. By changing the gate assignment for a particular aircraft late in the process, these passengers are forced to move to a different gate. Additionally, all of the bags for these passengers are waiting to depart at the original gate. By changing the gate, someone must collect these bags and move them to the new gate. Further, all of the personnel at both gates must be notified of the change.

In the present invention, the aircraft trajectories are meshed with the gate trajectories in real time 3 to 5 hours prior to arrival. For example, it is known 4 hours to arrival that Flight 123 will land 15 minutes early at 1205 PM, and is scheduled to taxi to gate 12. But gate 12 is occupied by Flight 321 until 1215 PM, which is Flight321's scheduled departure. In the current art, while the data may be displayed to a gate manager, the complexity of manually changing the gate is difficult so that it is likely that Flight 123 would land and wait 10 minutes for the gate.

In the present invention, using the goal function optimization, there are many possibilities to avoid this 10 minute delay. One such option would be to assign Flight 321 to a different gate and Flight 456 to gate 12, since Flight 456 is scheduled to depart gate 12 at 1155 AM. Or an alternative scenario is to assign Flight 123 to gate 15, where Flight 456 is parked. By running the goal function optimization process in the 3 to 5 hour window, it opens many possibilities to preclude Flight 123 from waiting for a gate once it lands.

Using the present invention, this simultaneous boarding problem can be identified earlier and an alternative gate assignment solution can be sought. In this case, as the on schedule aircraft is within the gate assignment window, given the predicted departure time of the late aircraft, the on schedule aircraft can be assigned a different gate so that the two boarding processes, although still done simultaneously, are not intertwined. Not only does this lower the passenger stress and improve product quality, the lowering of the confusion will often lead to a faster, more efficient boarding process, less confusion and less potential errors.

The foregoing description of the invention has been presented for purposes of illustration and description. Further, the description is not intended to limit the invention to the form disclosed herein. Consequently, variations and modifications commensurate with the above teachings, and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

We claim:

1. A computer implemented method for an aviation entity to manage, consistent with specified entity business goals, the temporal assignment of airport gates for use by a plurality of aircraft which are to-be-serviced by specified ground resources, including ground personnel, equipment and supplies, so as to deliver and receive specified passengers, their baggage and cargo during a specified time period, based upon specified, temporally-varying data pertaining to said aircraft, passengers and ground resources, said method comprising the steps of:

collecting and storing said specified data, processing said data to predict the trajectories of said plurality of aircraft, wherein said trajectories including the expected gate arrival time, required ground servicing period and projected departure time of each of said aircraft, processing said data to predict the loads imposed on said ground resources and gates associated with the movement of said passengers, equipment and supplies in relation to the arrival and departure of said plurality of aircraft, processing said data, trajectories and loads to identify the various possible ways to assign said gates so as to meet to a specified level the time constraints of said predicted trajectories and loads, and assigning to each of said plurality of aircraft a gate for use for a prescribed period, with said assignments being made in such a manner as to allow said aviation entity to better meet said business goals.

2. A method as recited in claim 1, wherein:

said assignment step involves the use of a goal function that reflects said entity business goals.

3. A method as recited in claim 1, further comprising the step of utilizing a measure to assess the accuracy of said predicted trajectories and loads to determine whether a specified degree of accuracy exists in said predictions before proceeding to identify the various possible ways to assign said gates so as to meet the time constraints of said predicted trajectories and loads.

4. A method as recited in claim 2, further comprising the step of utilizing a measure to assess the accuracy of said predicted trajectories and loads to determine whether a specified degree of accuracy exists in said predictions before proceeding to identify the various possible ways to distribute said ground system resources and assign said gates so as to meet the time constraints of said predicted trajectories and loads.

5. A method as recited in claim 1, further comprising the step of communicating said gate assignments to specified entity personnel for implementation of said assignments.

6. A method as recited in claim 1, further comprising the steps of:

monitoring the ongoing temporal changes in said specified data so as to identify when said temporal changes to said specified data exceed a specified level, updating said predicted trajectories and loads when said temporal changes to said specified data exceed said specified level, and if said specified degree of attainment of said business goals is not met by said previous gate assignments in view of said updated, predicted trajectories and loads, reassigning said gates to said plurality of aircraft in such a manner to allow achievement of specified degree of attainment of said business goals.

7. A computer program product in a computer readable memory for allowing an aviation entity to manage, consistent with specified entity business goals, the temporal assignment of airport gates for use by a plurality of aircraft which are to-be-serviced by specified ground resources, including ground personnel, equipment and supplies, so as to deliver and receive specified passengers, their baggage and cargo during a specified time period, based upon specified data pertaining to said aircraft, passengers and ground resources, said computer program comprising:

a means for collecting and storing said specified data and business goals, a means for processing said specified data to predict the trajectories of said plurality of aircraft, wherein said trajectories including the expected gate arrival time, required ground servicing period and projected departure time of each of said aircraft, a means for processing said data to predict the loads imposed on said ground resources and gates associated with the movement of said passengers, equipment and supplies in relation to the arrival and departure of said plurality of aircraft, a means for processing said data, trajectories and loads to identify the various possible ways to distribute said ground system resources and assign said gates so as to meet the time constraints of said predicted trajectories and loads, and a means for assigning to each of said plurality of aircraft a gate for use for a prescribed period, with said assignments being made in such a manner as to allow said aviation entity to optimally meet said business goals.

8. A computer program product as recited in claim 7 wherein said assignment means includes the use of a goal function that reflects said entity business goals.

9. A computer program product as recited in claim 7, further comprising a means for utilizing a measure to assess the accuracy of said predicted trajectories and loads to determine whether a specified degree of accuracy exists in said predictions before proceeding to identify the various possible ways to assign said gates so as to meet the time constraints of said predicted trajectories and loads.

10. A computer program product as recited in claim 8, further comprising a means for utilizing a measure to assess the accuracy of said predicted trajectories and loads to determine whether a specified degree of accuracy exists in said predictions before proceeding to identify the various possible ways to assign said gates so as to meet the time constraints of said predicted trajectories and loads.

11. A computer program product as recited in claim 7, further comprising a means for communicating said gate assignments to specified entity personnel for implementation of said assignments.

12. A computer program product as recited in claim 7, further comprising:

a means for monitoring the ongoing temporal changes in said specified data so as to identify when said temporal changes to said specified data exceed a specified level, a means for updating said predicted trajectories and loads when said temporal changes to said specified data exceed said specified level, and a means for reassigning said gates to said plurality of aircraft, if said specified degree of attainment of said business goals is not met by said previous gate assignments in view of said updated, predicted trajectories and loads, in such a manner to allow achievement of specified degree of attainment of said business goals.

13. A system, including a processor, memory, display and input device, that allows an aviation entity to manage, consistent with specified entity business goals, the temporal assignment of airport gates for use by a plurality of aircraft which are to-be-serviced by specified ground resources, including ground personnel, equipment and supplies, so as to deliver and receive specified passengers, their baggage and cargo during a specified time period, based upon specified data pertaining to said aircraft, passengers and ground resources, said system comprising:

a means for collecting and storing said specified data and business goals, a means for processing said specified data to predict the trajectories of said plurality of aircraft, wherein said trajectories including the expected gate arrival time, required ground servicing period and projected departure time of each of said aircraft, a means for processing said data to predict the loads imposed on said ground resources and gates associated with the movement of said passengers, equipment and supplies in relation to the arrival and departure of said plurality of aircraft, a means for processing said data, trajectories and loads to identify the various possible ways to assign said gates so as to meet the time constraints of said predicted trajectories and loads, and a means for assigning to each of said plurality of aircraft a gate for use for a prescribed period, with said assignments being made in such a manner as to allow said aviation entity to optimally meet said business goals.

14. A system as recited in claim 13 wherein said assignment means includes the use of a goal function that reflects said entity business goals.

15. A system as recited in claim 13, further comprising a means for utilizing a measure to assess the accuracy of said predicted trajectories and loads to determine whether a specified degree of accuracy exists in said predictions before proceeding to identify the various possible ways to assign said gates so as to meet the time constraints of said predicted trajectories and loads.

16. A system as recited in claim 14, further comprising a means for utilizing a measure to assess the accuracy of said predicted trajectories and loads to determine whether a specified degree of accuracy exists in said predictions before proceeding to identify the various possible ways to assign said gates so as to meet the time constraints of said predicted trajectories and loads.

17. A system as recited in claim 13, further comprising a means for communicating said gate assignments to specified entity personnel for implementation of said assignments.

18. A system as recited in claim 13, further comprising:

a means for monitoring the ongoing temporal changes in said specified data so as to identify when said temporal changes to said specified data exceed a specified level, a means for updating said predicted trajectories and loads when said temporal changes to said specified data exceed said specified level, and a means for reassigning said gates to said plurality of aircraft, if said specified degree of attainment of said business goals is not met by said previous gate assignments in view of said updated, predicted trajectories and loads, in such a manner to allow achievement of specified degree of attainment of said business goals.

* * * * *